United States Patent [19]  [11] 4,143,283
Graf et al.  [45] Mar. 6, 1979

[54] BATTERY BACKUP SYSTEM

[75] Inventors: Fredy E. Graf, San Diego; Michael S. Krystek, Spring Valley, both of Calif.

[73] Assignee: General Atomic Company, San Diego, Calif.

[21] Appl. No.: 870,113

[22] Filed: Jan. 17, 1978

[51] Int. Cl.² .............. H02J 7/00; H02J 9/04; H02H 3/24
[52] U.S. Cl. .............. 307/66; 307/71; 307/130; 320/16; 361/92; 364/900
[58] Field of Search .............. 307/66, 64, 65, 154, 307/200 A, 264, 296; 364/900, 200; 320/15, 16, 7

[56] References Cited

U.S. PATENT DOCUMENTS

| 3,718,848 | 2/1973 | Hines | 320/7 |
| 3,757,131 | 9/1973 | Krutz | 307/66 |
| 3,927,800 | 12/1975 | Zinsmeyer | 222/26 |
| 4,034,193 | 7/1977 | Jackson | 235/151.34 |

FOREIGN PATENT DOCUMENTS 1428661  3/1976  United Kingdom .............. 307/66

Primary Examiner—Richard A. Wintercorn
Assistant Examiner—S. D. Schneyer
Attorney, Agent, or Firm—Fitch, Even, Tabin & Luedeka

[57] ABSTRACT

A battery backup system provides DC power to a data processing system in the event of an AC power failure. A preferred embodiment supplies DC power from a plurality of series-connected batteries at a voltage level sufficient to operate a data processor. After a time delay, the batteries are connected in parallel to provide DC power at a lower voltage level sufficient to maintain information stored in a memory.

16 Claims, 3 Drawing Figures

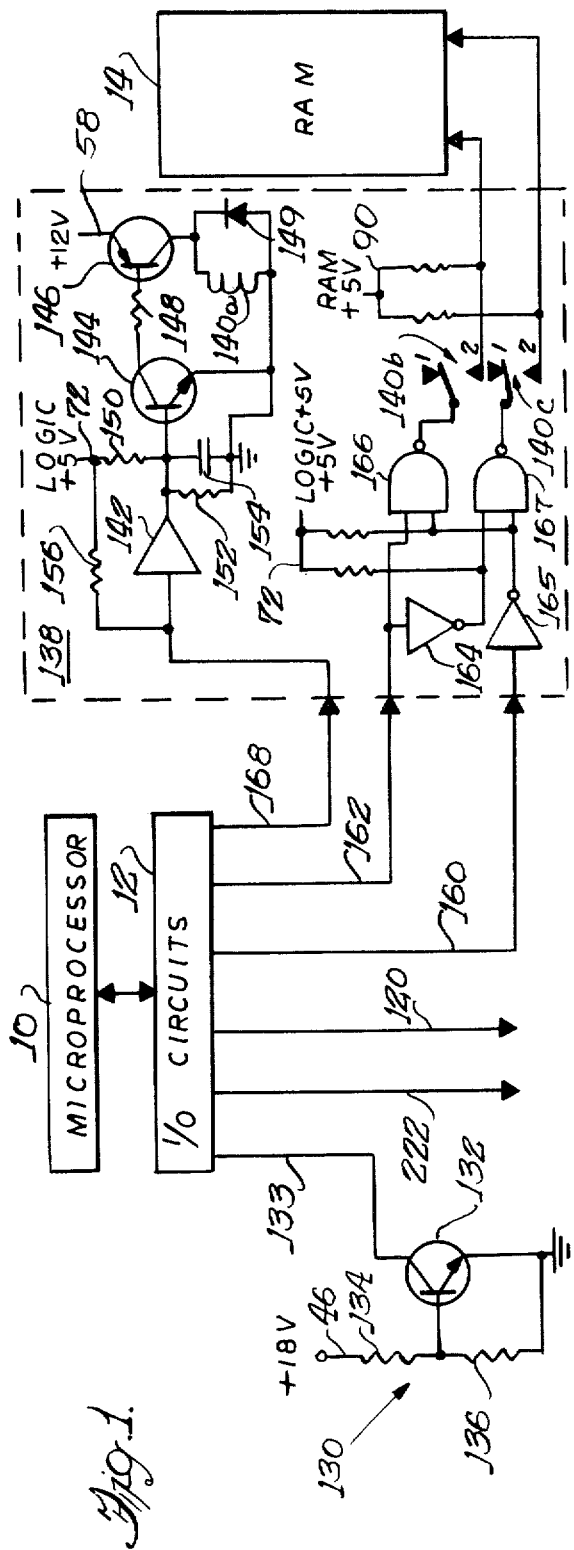
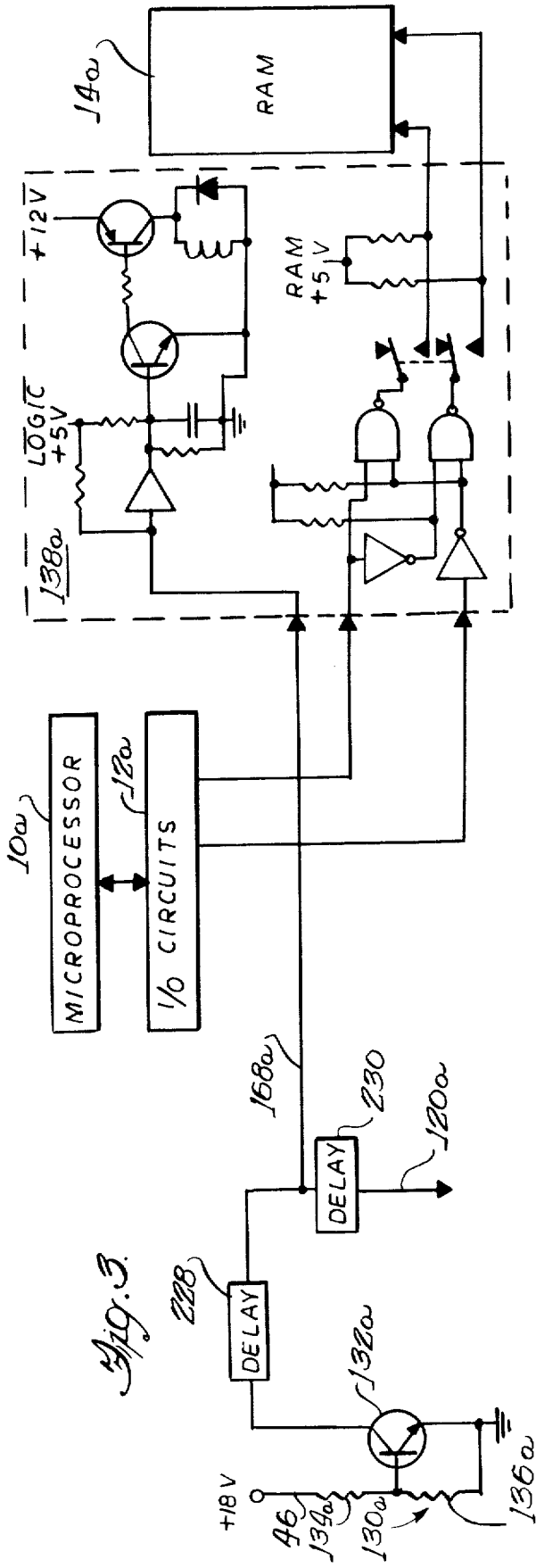
Fig. 1.
Fig. 3.

BATTERY BACKUP SYSTEM

BACKGROUND OF THE INVENTION

The present invention relates to data processing systems, and more particularly to backup power systems for data processing systems.

Data processing systems often have a processing unit such as a central processing unit, microprocessor, or hardwired logic circuit and are usually operated with DC (direct current) power which is converted from AC (alternating current) power. Data processing systems, or data processors, also often have one or more memory circuits for storing information, and many types of these memory circuits require an uninterrupted supply of power to maintain the information stored within them. Thus, it is necessary to provide backup power systems to supply DC power to the data processors in the event the AC power fails or the data in the memory circuits can be lost.

Prior backup power systems have included an array of batteries that supply DC power to the data processor at a voltage level sufficient to operate the data processor. These prior systems have often suffered in that the batteries were exhausted after a relatively short time while supplying this relatively high DC voltage level to the data processor. To provide a backup power system that would supply power for a reasonable time, it was necessary to use relatively large batteries. While these batteries provided the necessary power, they were often physically large and bulky. Other backup systems merely provided a lower voltage power that would only supply power to the memory so that data would not be lost. This precluded operation of the data processor to enable an operator to retrieve important information from the memory.

Accordingly, it is an object of the present invention to provide a backup power system that does not have the above mentioned undesirable attributes.

Another object of the present invention is to provide an improved backup power system that utilizes a number of small batteries to supply power at a lower voltage to maintain data in memory and is also capable of supplying power at higher operating voltages for running the data processor for short periods so that data can be retrieved.

Other objects and advantages will become apparent upon reading the following detailed description and drawings of which:

FIG. 1 is a schematic diagram of a data processor together with a portion of an apparatus embodying the present invention;

FIG. 3 is a schematic diagram of a data processor utilizing a portion of an alternative embodiment of the present invention.

SUMMARY OF THE INVENTION

Figure 2:
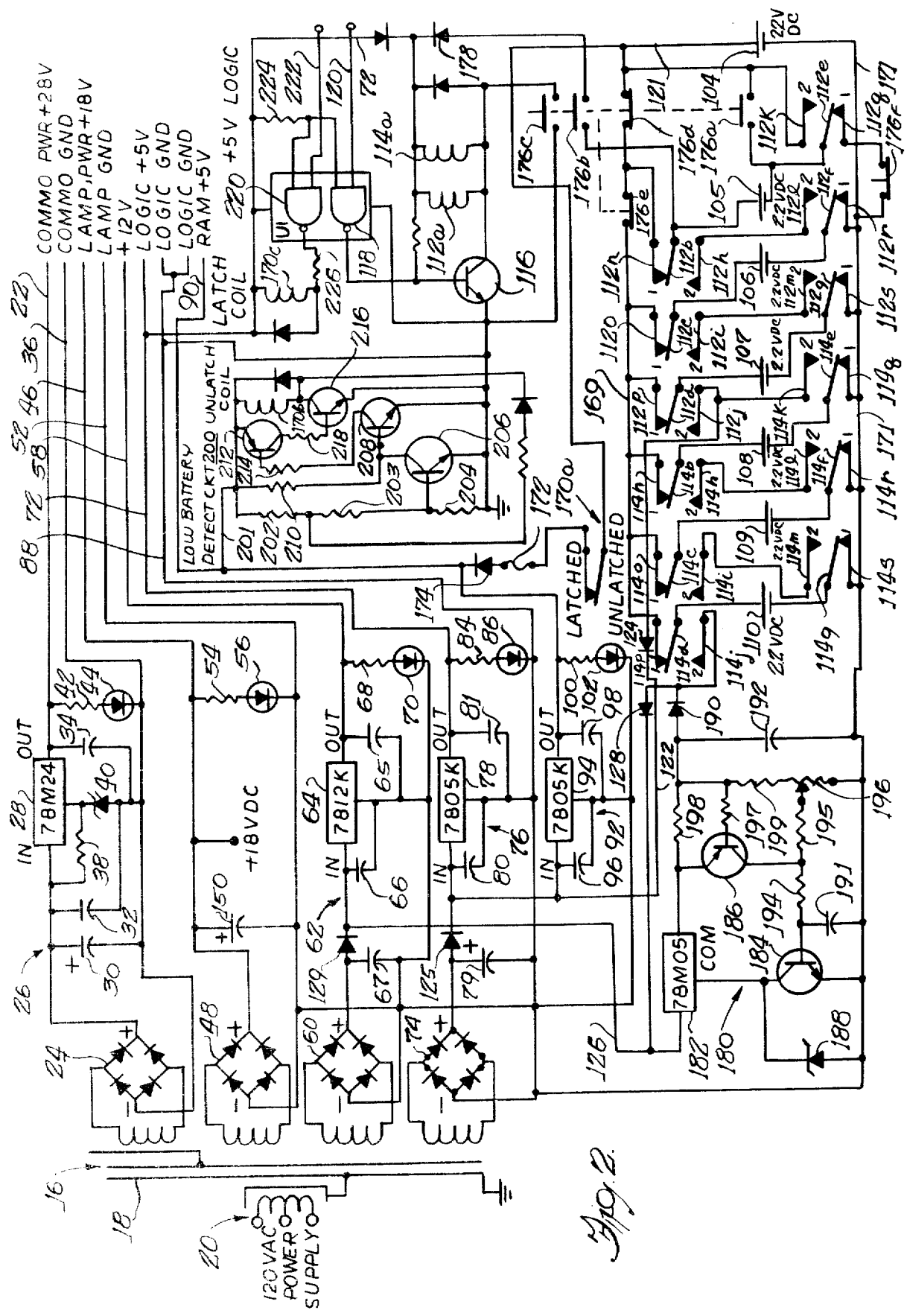
FIG. 2 is a schematic diagram of the remaining portion of the embodiment of FIG. 1.

Data processors require a relatively high DC voltage level input to be operated. However, the memory circuits associated with the systems often require a much lower DC voltage level for maintaining the information contained within the memory circuits.

Broadly stated, the present invention provides a battery backup system which supplies power at the relatively low DC voltage level to maintain the information in the memory which substantially prolongs the useful life of the batteries. This will hereinafter often be referred to as the "maintenance mode". The backup power system of the present invention can also provide power at the relatively high DC voltage level so that the data processor may be operated to retrieve the information stored in the memory and this will be referred to as the "operational mode".

The preferred embodiment of the present invention supplies backup DC power for powering a data processor having memory means for storing information, wherein the memory means has a first minimum DC voltage level requirement for maintaining the information stored in the memory. The preferred embodiment provides a processing unit having a higher minimum DC operating voltage level requirement than the first voltage level which may comprise a microprocessor or a dedicated hard-wired logic circuit, for example.

The preferred embodiment of the present invention further provides means for sensing an AC power failure and a plurality of storage means such as batteries for storing and supplying DC power. Each of the storage means supply DC power generally at or somewhat above the first minimum voltage level. There is also provided means for operatively connecting the plurality of storage means in series so that the storage means can supply DC power generally at or above the higher minimum voltage level to the processing unit so that it can be operated in the event the AC power fails.

There is further provided means responsive to an enabling signal from the processing unit for operatively connecting the plurality of storage means in parallel so that the storage means can supply DC power at about the first minimum voltage level to the memory means whereby the information is maintained in the memory but the processing unit is rendered inoperative. The processing unit is adapted to transmit the enabling signal to the parallel connecting means in response to the sensing means sensing an AC power failure. The processing unit transmits the enabling signal after a predetermined time delay so that the processing unit is operable under the power of the plurality of series-connected storage means until the expiration of the time delay. Means for disabling the parallel connecting means and enabling the series connecting means in response to operator manipulation are also provided so that the processing unit can be rendered operable until the expiration of the time delay, should the user of the data processor system so desire. The processing unit is adapted to retransmit the enabling signal to the parallel connecting means after the time delay.

DETAILED DESCRIPTION

Turning now to the drawings and particularly to FIG. 1, the processing unit is shown as a microprocessor 10 having associated I/O (input and output) circuits 12. The memory means for storing information comprise random access memory (RAM) 14 having a plurality of IC chips (not shown). The RAM 14 requires DC power to be supplied at a minimum voltage level of approximately 1.5 volts for the information stored within the RAM 14 to be maintained. The microprocessor 10 has a higher minimum operating voltage level requirement of about +5 volts and about +12 volts.

For normal operation of the data processor shown herein, the regular DC power supply provides +28 volts for communication power, +18 volts for powering lamps, +12 volts and +5 volts for the microprocessor operation, and +5 volts for the RAM 14. The regular DC power supply provides DC power converted from AC power when the AC power is present. Referring to FIG. 2, the regular DC power supply is shown generally at 16 and comprises a transformer 18 having a primary winding 20 for the AC power. The +28 volt communication power provided on a line 22 is produced by a full-wave rectifier 24 connected to a secondary winding of the transformer 18 and a voltage regulator circuit 26 which is coupled to the full-wave rectifier 24. The voltage regulator circuit 26 comprises a voltage regulator integrated circuit or (IC) 28 with capacitors 30, 32 and 34 connected between the +28 volt communication line 22 and a communication ground line 36. The voltage regulator circuit 26 further comprises a resistor 38 and a zener diode 40 connecting the +28 volt line 22 and the communication ground line 36 with a resistor 42 and a LED 44 also connecting the lines 22 and 36.

The +18 volt lamp power is provided on a +18 volt line 46 which is produced by a full-wave rectifier 48 which is connected to another secondary winding of the transformer 18. A capacitor 50 connects the +18 volt line 46 to a lamp ground line 52. A resistor 54 and a LED 56 also connect the line 46 to the line 52.

The +12 volt power is provided at a +12 volt line 58 by a full-wave rectifier 60 which is connected to a secondary winding of the transformer 18, and by a voltage regulator circuit 62. The voltage regulator circuit 62 comprises a voltage regulator IC 64, capacitors 65-67, a resistor 68, and a LED 70. The logic +5 volt power supply is provided at a logic +5 volt line 72 and is produced by a full-wave rectifier 74 which is connected to a secondary winding of the transformer 18, and by a voltage regulator circuit 76 which comprises a voltage regulator IC 78, capacitors 79-81, resistor 84, and LED 86. The logic ground is provided at a logic ground line 88. The RAM +5 volt power is provided at a RAM +5 volt line 90 which is produced by the full-wave rectifier 74 and a voltage regulator circuit 92 which comprises a voltage regulator IC 94, capacitors 96 and 98, a resistor 100, and a LED 102. The regular power supply 16 supplies the abovementioned voltages as long as AC power is present.

When the AC power fails, the plurality of storage means, which are shown to be batteries 104-110, will supply power to maintain the information stored in the RAM 14 as well as operate the microprocessor 10 when so desired. Each of the batteries supplies DC power at least at the minimum DC voltage level required for maintaining information stored in the RAM 14. Thus, the batteries 104-110 in this embodiment are 2.2 volt batteries for supplying power somewhat above the minimum required DC voltage level for the RAM 14 which is about 1.5 volts. However, the batteries 104-110 are initially connected in series so that the batteries can supply DC power at the minimum voltage level required by the microprocessor 10 in order for the microprocessor 10 to operate for a time after the AC power fails.

The means for operatively connecting the plurality of batteries in series comprises a relay 112 which has a coil 112a, movable contacts 112b-g, and stationary contacts 112h-m, and a relay 114 which has a coil 114a, movable contacts 114b-g, and stationary contacts 114h-m. The coils 112a and 114a are coupled between the +5 volt logic line 72 and the collector of a transistor switch 116 whose base is connected to the output of a NAND gate 118. The NAND gate 118 has one input connected to the +5 volt logic line 72 and the other input connected to a battery switch line 120.

When the coils 112a and 114a are not energized, the movable contacts are in Position 1, as shown, and are in Position 2 when the coils are energized. The battery switch line 120 is initially at a logical 0 level which causes the NAND gate 118 to provide a logical 1 or high level to the base of the transistor 116 which turns on the transistor 116 allowing the coils 114a and 112a to be energized. The energization of the coils 112a and 114a, respectively, causes the movable contacts 112b-g to contact the stationary contacts 112h-m (Position 2) and the movable contacts 114b-g to contact the stationary contacts 114h-m (Position 2).

A line 121 connects the positive terminal of the battery 104 to the negative terminal of the battery 105 by the contacts 112e and 112k when in Position 2. The positive terminal of the battery 105 is connected to the negative terminal of battery 106 by the contacts 112b, 112h, 112l, and 112f when the movable contacts are in Position 2. The remainder of the batteries are similarly series-connected by their associated contacts when coils 112a and 114a are energized causing the movable contacts to assume Position 2.

While the coils are energized, line 122 connects the positive terminal of battery 107 to the input of the logic +5 voltage regulator circuit 76 and the input of the RAM +5 voltage regulator circuit 92 by means of the contacts 112d and 112j and a diode 124. Thus, the batteries 104-107 when series-connected (Position 2), deliver 8.8 volts at the inputs of the logic +5 and RAM +5 voltage regulator circuits 76 and 92, respectively. The regulator circuits 76 and 92 regulate the voltages of their respective inputs to output +5 volts each even though the batteries input a greater voltage. A diode 125 prevents the batteries from charging the capacitor 79 while AC power is present and the batteries are not needed.

Similarly, line 126 connects the positive terminal of the battery 110 to the input of the +12 voltage regulator circuit 62 by the contacts 114d and 114j and a diode 128. Thus, when the batteries 104-110 are series-connected, 15.4 volts is delivered to the input of the +12 voltage regulator circuit 62 which provides +12 volts to the microprocessor 10 from the line 58 when the AC power fails. The batteries are series-connected while the AC power is present so that should the AC power fail, the batteries can immediately deliver the power required to continue operating the microprocessor 10 and the RAM 14. A diode 129 similarly prevents the batteries from charging the capacitor 67 while AC power is present.

In accordance with another aspect of the present invention and referring to FIG. 1, the means for sensing an AC power failure is shown generally at 130. The sensing means generally comprises a transistor 132 whose base is coupled to the +18 volt line by means of a pair of voltage-dividing resistors 134 and 136. Thus, when the AC power fails, the +18 volt power goes to zero which cuts off the transistor 132 which in turn provides a logical 1 to the microprocessor 10 via line 133 and the I/O circuits 12.

The microprocessor then transmits an enabling signal on the battery switch line 120 after a predetermined delay, to switch the batteries from being series-connected (operational mode) to being parallel-connected (maintenance mode). The purpose of the time delay, which in this embodiment is approximately 30 to 45 seconds, is to allow the user of the data processor to retrieve any data that is stored in the RAM 14 before the microprocessor switches to the maintenance mode which will render the microprocessor inoperable.

When the microprocessor 10 does switch to the maintenance mode by sending the enable signal on the battery switch line 120, the power supplied to the microprocessor 10 on the logic +5 volt line 72 and the +12 volt line 58 (FIG. 2) will go from +5 volts to zero and +12 volts to zero, respectively. As the voltages approach zero, the microprocessor can become incoherent and begin undesirably writing random data into the RAM 14 which will destroy the data which was stored in the RAM 14. In order to prevent this, the preferred embodiment of the present invention further provides means for disabling the microprocessor's means for writing information into the memory. The means for disabling is shown comprising a RAM write disable circuit 138 which comprises a relay 140, and an inverter 142 whose output is connected to the base of a transistor 144 whose collector is connected to the base of a transistor 146 by a resistor 148. A coil 140a of the relay 140 is parallel-connected to a diode 149 and connected to the collector of the transistor 146 whose emitter is coupled to the +12 volt line 58 (FIG. 2). The base of the transistor 144 is coupled to the +5 volt logic line 72 (FIG. 2) by a resistor 150 and is also connected to ground by a parallel-connected resistor 152 and capacitor 154. The input of the inverter 142 is connected to the logic +5 volt line 72 (FIG. 2) by a resistor 156.

When the batteries are series-connected, +5 and +12 volts are available at the logic +5 volt line 72 and the +12 volt line 58, respectively. The +5 volts supplied to the base of the transistor 144 turns on the transistor 144 which in turn turns on the transistor 146 which energizes the relay coil 140a, of the relay 140 which causes the contacts 140b and 140c of the relay 140 to close (Position 2). The microprocessor 10 is able to write data into a chip of the RAM 14 only when it can signal the chips by means of a pair of chip select lines 160 and 162 which are connected to the logic gates 164–167. The contacts 140b and 140c of the relay 140 couple the output of the logic gates 164–167 to the RAM 14 and the microprocessor 10 can communicate with the RAM 14 only when the contacts 140b and 140c are closed (Position 2).

As noted above, when the batteries 104–110 are series-connected, the coil 140a is energized which causes the contacts 140b and 140c to be closed. In order to prevent undesirable "scrambling" of the data in the RAM 14 when the microprocessor switches to the maintenance mode, the microprocessor 10 will first transmit a disable signal by means of a line 168 to the input of the inverter 142 which turns off the transistor 144, which in turn turns off the transistor 146 causing the coil 140 to de-energize resulting in the contacts 140b and 140c opening. The microprocessor 10 can now no longer communicate with the RAM 14 for a time period determined by the resistor 150 and the capacitor 154 (about ½ sec.) which insures the safety of the data contained therein. The microprocessor 10 can then send the battery switch enable signal along the battery switch line 120 and cause the batteries to switch to the parallel connection and the maintenance mode.

The means responsive to the enabling signal from the microprocessor for operatively connecting the plurality of batteries in parallel generally comprises relays 112 and 114, referring now to FIG. 2. The relays 112 and 114 comprise the coils 112a and 114b, the movable contacts 112b–112g, 114b–114g (which are also part of the series-connecting means) and, in addition, stationary contacts 112n–112s and 114n–114s. The parallel connecting means further comprises the transistor switch 116 and the NAND gate 118.

When the microprocessor 10 switches the batteries to be parallel-connected, it transmits an enable signal on the battery switch line 120 which causes the NAND gate 118 to output a logical 0 which cuts off the transistor switch 116. This in turn causes the relay coils 112a and 114a to de-energize resulting in the movable contacts 112b–112g to contact the stationary contacts 112n–112s (Position 1) of the relay 112 and also causes the stationary contacts 114b–114g to contact the stationary contacts 114n–114s (Position 1) of the relay 114. Thus, when the coils 112a and 114a are de-energized (and the contacts are in Position 1), the positive terminals of the batteries 106–110 are connected together by the movable contacts 112c–112d and 114c–114d, and the stationary contacts 112o–p, and 114o–114p which are connected together by a bus line 169. Similarly, the negative terminals of the batteries 106–110 are connected by the movable contacts 112f–112g, and 114f–114g, and the stationary contacts 112r–114s and 114r–114s which are connected together by a bus line 171. The positive terminal of the battery 104 is connected to the positive terminal bus line 169 by the line 121 and the normally closed contacts 176d and 176e of the push-button switch 176. The positive terminal of the battery 105 is connected to the bus line 169 by the contacts 112b and n, (Position 1) and the contact 176l of the switch 176. The negative terminal of the battery 104 is connected to the negative terminal bus line 171 and the negative terminal of the battery 105 is connected to the bus line 171 by the contacts 112e and 112q (Position 1) and the normally closed contact 176f of switch 176.

The positive terminal of the battery 104 is connected to the RAM +5 volt line 90 by the contacts 170a (closed position as shown) of a relay 170, a fuse 172 and a diode 174. Thus, when the microprocessor switches to the maintenance mode, the coils 112a and 114g are de-energized causing the movable contacts of relays 112 and 114 to assume Position 1 and the batteries to be switched into parallel connection which provides 2.2 volts (less the diode drop of the diode 174 of about 0.4 volt or 1.8 volts) to the RAM 14. The 1.8 volts is sufficient to maintain the information in the RAM but is insufficient to operate the microprocessor 14.

The batteries 104–110 may be D-size batteries, for example, to provide the minimum DC voltage level required to maintain the information stored in the RAM 14 for a period of 48 hours while in the maintenance mode. As noted above, a 30–45 second interval was provided in which the user could operate the microprocessor while the batteries were series-connected in order to retrieve selected important information stored in the RAM 14 until the microprocessor switches the batteries to maintenance mode. Should the power failure have occurred while the user is away, such as at night for example, the user may need to operate the microprocessor 10 after the batteries have been switched to the maintenance mode. Accordingly, there is further provided means, adapted for manipulation, for disabling the parallel connecting means and enabling the series connecting means so that the microprocessor 10 is again operable. The means for disabling the parallel connecting means and enabling the series-connecting means comprises the push-button switch 176 having the contacts 176a-176f. When the switch 176 is depressed, the contacts 176d and 176e open and disconnect the batteries 104 and 105 from the other batteries. Contact 176a closes and connects the positive terminal of battery 104 to the negative terminal of battery 105 whose positive terminal is connected to the coils 112a and 114a by the contact 176b (closed position) and a diode 178 so that the batteries 104 and 105 are series-connected to the relay coils 112a and 114a. The contact 176c (closed position) of the push-button switch 176 shorts the transistor switch 116 which allows the relay coils 112a and 114a to energize. The energization of these coils causes the movable contacts 112b-112g of the relay 112 and the movable contacts 114b-114g of the relay 114 to assume Position 2 so that the parallel connecting means is disabled and the series connecting means is enabled. The batteries 104-110 are now series-connected again so that the +12 volts, the logic +5 volts and the RAM +5 volts are again supplied.

The microprocessor 10, powered from the +12 and logic +5 volt supplies, returns the battery switch line 120 to a logical 0 so that the batteries remain series-connected after the switch 176 is released. The user may now operate the microprocessor 10 for another 30-45 second interval before the microprocessor 10 returns the batteries 104-110 to the maintenance mode. This results from the microprocessor 10 sensing that the power failure remains through sensing means 130 and transmitting the disabling signal on the line 168 and the battery switch enable signal on the line 120 after the delay of 30-45 seconds as described above.

Since the batteries 104-110 are series-connected while the AC power is available, a single battery charging circuit 180 may charge the batteries until the AC power fails. The charging circuit 180 comprises a voltage regulator 182, transistors 184 and 186, diodes 188 and 190, capacitors 191 and 192 and resistors 194-199. The charging circuit 180 charges the batteries 104-110 until the AC power fails at which time the series-connected batteries supply the +12 volt, logic +5 volt, and RAM +5 volt until the microprocessor 10 switches the batteries to the maintenance mode.

The batteries continue in the maintenance mode supplying the lower DC maintenance voltage level required for the RAM 14 until a low battery detect circuit 200 determines that the batteries have been dangerously drained and disconnects the batteries (approximately 48 hours). The low battery detect circuit 200 is connected to the diode 174 at a line 201 and comprises a voltage divider comprised of resistors 202 through 204. The base of a transistor 206 is connected to the junction of the resistors 203 and 204. When the voltage at the line 201 falls below a reference voltage (1.5 volts) determined by the voltage-divider, the transistor 206 is turned off. The base of a transistor 208 is connected to the collector of the transistor 206 and is connected to the line 201 by a resistor 210. Therefore the transistor 208 turns on when the transistor 206 turns off. The collector of the transistor 208 is connected to the base of a transistor 212 by a resistor 214. The emitter of the transistor 212 is connected to the line 201 and turns on when the transistor 208 turns on. The collector of the transistor 212 is connected to the base of a transistor 216 by a resistor 218 which turns on when the transistor 212 turns on. An "unlatch" coil 170b of the relay 170 is connected between the collector of the transistor 216 and to the line 201. Therefore, the unlatch coil 170b is momentarily energized when the transistor 216 turns on as the voltage at the line 201 drops below the voltage reference. The energization of the unlatch coil 170b causes the contacts 170a of the relay 170 to open which disconnects the batteries 104-110 from the RAM +5 volt line 90. This protects the batteries from deteriorating when they can no longer deliver the minimum DC voltage level required for maintaining the information stored in the RAM 14.

Summarizing the operation of the preferred embodiment, when the primary winding 20 is connected to the AC power, the regular power supply 16 supplies all the necessary DC voltages for operating the data processor as well as DC voltages such as the communication power +28 volt and the lamp power +18 volt. One of the first things the microprocessor 10 (FIG. 1) does upon being powered up is to enable the RAM backup system to be utilized if necessary. The microprocessor 10 does this by transmitting a RAM backup enable signal to a NAND gate 220 which has one input connected to a RAM backup enable line 222 and the other input connected to the +5 volt logic line 72 by a resistor 224. The output of the NAND gate 220 is connected to a "latch" coil 170c of the relay 170 by a resistor 226. The latch coil 170c is connected to the +5 volt logic line 72 and is energized when the microprocessor 10 transmits the RAM enable signal on the line 222. This causes the contacts 170a of the relay 170 to close which will allow the batteries 104-110 to supply the DC voltage level required to maintain the information in the RAM 14 should the parallel connecting means be enabled.

As the microprocessor 10 is powering up, referring now to FIG. 1, the logic +5 volt and the +12 volt lines are going from 0 to 5 and 0 to 12 volts, respectively. The RAM write disable circuit provides a delay of about ½ second before the microprocessor 10 is able to write in the RAM 14 because the microprocessor 19 may be incoherent while it is powering up. Thus, as the voltage at the logic +5 volt line 72 begins rising above 0, the transistor 144 turns on after the ½ second delay determined by the capacitor 154 and the resistor 150 which in turn turns on the transistor 146. The turning on of the transistor 146 energizes the coil 140a of the relay 140 causing the contacts 140b and 140c to close allowing the microprocessor 10 to communicate with the RAM 14 by the chip select lines 160 and 162. After the ½ second delay, the +5 and +12 voltages are sufficiently high to assure that the microprocessor 10 is coherent.

As the 30 5 volt logic line 72 approaches 5 volts, referring now to FIG. 2, the relay coils 112a and 114b of the relays 112 and 114 are energized since there is a logical 0 on the battery switch line 120 from the microprocessor 10 which causes the movable contacts of the relays 112 and 114 to assume Position 2 so that the series connecting means is enabled. The batteries 104-110 are now ready to supply the DC voltage level required to operate the data processor should the AC power fail. The battery charger circuit 180 may also charge the batteries 104-110 while the AC power is present.

With reference to FIG. 1, an AC power failure will be detected by the sensing means 130 which will transmit this information to the microprocessor 10 by the I/O circuits 12. The microprocessor 10 will then generate a delay of about 30-45 seconds which is software controlled to allow the user to operate the microprocessor 10 before the microprocessor switches the batteries to the maintenance mode. At the end of the time delay, the microprocessor 10 will send a disable signal on the RAM write disable line 168 to the RAM write disable circuit 138. This will disable the microprocessor 10 from harming the data in the RAM 14 when the microprocessor 10 subsequently switches the movable contacts of relays 112 and 114 to Position 1 (FIG. 2) and thus the batteries 104-110 to the maintenance mode.

The microprocessor 10 switches the batteries to the maintenance mode by transmitting the battery switch enable signal on the line 120 which will enable the parallel connecting means and disable the series connecting means referring now to FIG. 2. An enable signal on the line 120 causes the output of the NAND gate 118 to go low which turns off the transistor switch 116 which de-energizes the relay coils 112a and 114a. This causes the movable contacts of the relays 112 and 114 to assume Position 1 so that the series connecting means is disabled and the parallel connecting means is enabled. The batteries will continue in the maintenance mode until the batteries become exhausted so that the low battery detect circuit 200 will disconnect the batteries. During the maintenance mode, the user may operate the data processor by pushing the switch 176 which will switch the batteries from the maintenance mode to the operational mode for the time delay interval of 30-45 seconds during which the +12 volts, the logic +5 volts and the RAM +5 volts are again supplied. As noted before, as the microprocessor is powering up and the logic +5 volt and +12 volt lines are returning to +5 and +12 voltage levels, respectively, the RAM write disable circuit provides a delay of about ½ second before the microprocessor 10 is able to write in the RAM 14, because the microprocessor may be incoherent while it is powering up.

An alternative embodiment of the present invention is shown in FIG. 3 in which the battery backup system is not controlled by the microprocessor 10. The sensing means 130a senses an AC power failure and provides a signal which becomes the RAM write disable signal after a delay interval which is produced by a delay circuit 228. The delay interval allows the user to operate the microprocessor 10a before the microprocessor is disabled from writing in the RAM 14a. This disable signal is transmitted to the RAM write disable circuit 138a by means of the RAM write disable line 168a. After a second delay produced by a delay 230, the signal provided by the sensing means 130a is used to enable the parallel connecting means and is the battery switch enable signal as discussed above. The second delay interval allows the RAM writing means to be disabled before the microprocessor switches the batteries to the maintenance mode so that the microprocessor 10a cannot disrupt the information stored in the RAM 14a as the microprocessor becomes incoherent as it powers down.

It will, of course, be understood that modifications of the present invention, and its various aspects, will be apparent to those skilled in the art, some being apparent only after study, and others being merely matters of routine electronic design. As such, the scope of the invention should not be limited by the particular embodiments and specific construction herein described, but should be defined only by the appended claims, and equivalents thereof.

Various features of the invention are set forth in the following claims.

What is claimed is:

1. A backup power system for a user operated data processor having a memory for storing information, said processor having a high DC voltage level input requirement for operating the data processor, said memory having a lower DC voltage level input requirement for maintaining the information in the memory, said data processor being powered by DC power converted from AC power when the AC power is present, said system comprising:
    a plurality of DC power storage means, each of said storage means supplying power generally at said lower DC voltage level;
    means for sensing an AC power failure;
    means responsive to said sensing means for operatively connecting said plurality of storage means in parallel so that said plurality of storage means supply power at least at said lower DC voltage level to the memory of said data processor for maintaining the information in the memory;
    means for disabling the parallel connecting means and for operatively connecting said plurality of storage means in series so that said plurality of storage means supply DC power at least at said high DC voltage level to the data processor to thereby permit the user to operate the data processor and at least retrieve information stored in the memory;
    means for disabling the series connecting means and enabling said parallel connecting means so that the DC voltage level supplied by said plurality of storage means can be reduced to said lower DC voltage level.

2. The system as defined in claim 1 wherein said data processor includes means for writing information into the memory, said system further comprising means for disabling said writing means before the series connecting means is disabled.

3. The system as defined in claim 1 wherein said data processor includes means for writing information into the memory, said system further comprising means for disabling the writing means for a predetermined time period beginning when said plurality of storage means have been operatively connected in series.

4. The system as defined in claim 1 wherein the series connecting means is enabled while the AC power is present and the parallel connecting means has means for operatively connecting the plurality of storage means in parallel a second predetermined time period after the sensing of an AC power failure, said plurality of storage means being operatively connected in series during said second time period thereby enabling the data processor to be operated during said time period.

5. The system as defined in claim 1 wherein the series connecting means is enabled while the AC power is present, the system further comprising means operatively connected to an AC power source, for charging said plurality of storage means while AC power is present.

6. The system as defined in claim 1 wherein the series connecting means and the parallel connecting means comprise a relay having a single-pole, double-throw switch for each of said plurality of storage means.

7. The system as defined in claim 6 wherein said means for disabling the parallel connecting means and for operatively connecting said plurality of storage means in series is enabled when said relay is energized, said disabling means further comprising a switch means for coupling at least one of said plurality of storage means to said relay to energize said relay.

8. A DC power system for replacing DC power converted from AC power when the AC power is not present, the DC power for powering a data processor having memory means for storing information, wherein the memory means has a first minimum DC voltage level requirement for maintaining the information stored in the memory, said DC power system comprising:
- a processing unit having a higher minimum DC operating voltage level requirement than said first voltage level;
- means for sensing an Ac power failure;
- a plurality of storage means for storing and supplying DC power, each of said storage means supplying DC power generally at said first voltage level;
- means for operatively connecting said plurality of storage means in series so that said plurality of storage means supply DC power at least at said higher minimum voltage level to the processing unit whereby the processing unit is rendered operative;
- means responsive to an enabling signal from the processing unit for operatively connecting said plurality of storage means in parallel so that said plurality of storage means supply DC power at least at said first minimum voltage level to the memory means whereby the information is maintained in said memory, but said processing unit is rendered inoperative;
- said processing unit transmitting said enabling signal to the parallel connecting means in response to the sensing means sensing an AC power failure, said processing unit transmitting said enabling signal after a predetermined time delay so that the processing unit is operable under the power of said plurality of series-connected storage means until the expiration of said time delay.

9. The system as defined in claim 8 wherein said processing unit includes means for writing information into the memory means, said system further comprising means for disabling said writing means before the processing unit transmits the parallel connecting means enable signal.

10. The system as defined in claim 8 wherein said processing means includes means for writing information into the memory means, said system further comprising means for disabling the writing means for a predetermined time period beginning when said plurality of storage means have been operatively connected in series.

11. The system as defined in claim 8 wherein the plurality of storage means are connected in series while the AC power is present, the system further comprising means operatively connected to an AC power source, for charging said plurality of storage means while AC power is present.

12. The system as defined in claim 8 wherein the series connecting means and the parallel connecting means comprise a relay having a single-pole, double-throw switch for each of said plurality of storage means.

13. The system as defined in claim 12 wherein said plurality of storage means are operatively connected in series when said relay is energized, said series connecting means further comprising a switch means for coupling at least one of said plurality of storage means to said relay to energize said relay.

14. The system as defined in claim 8 further comprising means adapted for manipulation for disabling the parallel connecting means and enabling the series connecting means so that the processing unit is again operable until the expiration of said time delay.

15. A data processing system powered by DC power and capable of replacing DC power converted from AC power when the AC power is not present, the data processing system comprising:
- memory means for storing information having a first minimum DC voltage level requirement for maintaining the information stored in the memory;
- a processing unit having a higher minimum DC operating voltage level requirement than said first voltage level;
- a plurality of storage means for storing and supplying DC power, each of said storage means supplying DC power generally at said first voltage level;
- means for operatively connecting said plurality of storage means in parallel so that the plurality of storage means supply DC power at least at said first minimum voltage level to the memory means whereby the information is maintained in said memory, but said processing unit is rendered inoperative;
- means for disabling the parallel connecting means and for operatively connecting the plurality of storage means in series so that said plurality of storage means supply DC power at least at said higher minimum voltage level to the processing unit whereby the processing unit is rendered operative; and
- means for disabling the series connecting means ad enabling said parallel connecting means so that the DC power supplied by the storage means can be reduced to said first voltage level.

16. A switching system for a backup power system for a user operated data processor having a memory for storing information, said processor having a high DC voltage level input requirement for operating the data processor, said memory having a lower DC voltage level input requirement for maintaining the information in the memory, said data processor being powered by DC power converted from AC power when the AC power is present, said backup power system having a plurality of DC power storage means, each of the storage means supplying power generally at said lower DC voltage level, said switching system comprising:
- means for sensing an AC power failure;
- means responsive to said sensing means for operatively connecting said plurality of storage means in parallel so that said plurality of storage means supply power at least at said lower DC voltage level to the memory of said data processor for maintaining the information in the memory;
- means for disabling the parallel connecting means and for operatively connecting said plurality of storage means in series so that said plurality of storage means supply DC power at least at said high DC voltage level to the data processor to thereby permit the user to operate the data processor and at least retrieve information stored in the memory;
- means for disabling the series connecting means and enabling said parallel connecting means so that the DC voltage level supplied by said plurality of storage means can be reduced to said lower DC voltage level.

* * * * *

UNITED STATES PATENT AND TRADEMARK OFFICE
CERTIFICATE OF CORRECTION

PATENT NO. : 4,143,283
DATED : March 6, 1979
INVENTOR(S) : Fredy E. Graf and Michael S. Krystek It is certified that error appears in the above-identified patent and that said Letters Patent are hereby corrected as shown below:

In column 8, line 38, "microprocessor 19" should be --microprocessor 10--.

In column 8, line 51, "as the 30 5 volt" should be --as the +5 volt--.

In column 9, line 13, "line 120" should be --line 20--.

In column 11, line 12 (claim 8), "sensing an Ac" should be --sensing an AC--.

In column 12, line 33 (claim 15), "means ad" should be --means and--.

Signed and Sealed this

Nineteenth Day of February 1980

[SEAL]

Attest:

SIDNEY A. DIAMOND

Attesting Officer   Commissioner of Patents and Trademarks